3 Sheets—Sheet 1

W. SCOTT.

MACHINE FOR BENDING ELECTROTYPE OR STEREOTYPE PLATES.

No. 11,279. Reissued Oct. 18, 1892.

Witnesses

Chas. H. Smith

Geo. T. Pinckney

Inventor

Walter Scott per Lemuel W. Serrell

Atty.

3 Sheets—Sheet 2.

W. SCOTT.

MACHINE FOR BENDING ELECTROTYPE OR STEREOTYPE PLATES.

No. 11,279. Reissued Oct. 18, 1892.

Witnesses
Chas. H. Smith
Geo. T. Pinckney

Inventor
Walter Scott
per Lemuel W. Serrell
Atty

3 Sheets—Sheet 3.

W. SCOTT.

MACHINE FOR BENDING ELECTROTYPE OR STEREOTYPE PLATES.

No. 11,279. Reissued Oct. 18, 1892.

Witnesses
Chas. H. Smith
Geo. T. Pinckney

Inventor
Walter Scott
per Lemuel W. Serrell
Atty.

UNITED STATES PATENT OFFICE.

WALTER SCOTT, OF PLAINFIELD, NEW JERSEY.

MACHINE FOR BENDING ELECTROTYPE AND STEREOTYPE PLATES.

SPECIFICATION forming part of Reissued Letters Patent No. 11,279, dated October 18, 1892.

Original No. 415,821, dated November 26, 1889. Application for reissue filed December 8, 1890. Serial No. 373,998.

*To all whom it may concern:*

Be it known that I, WALTER SCOTT, a citizen of the United States, residing at Plainfield, in the county of Union and State of New Jersey, have invented an Improvement in Machines for Bending Electrotype, Stereotype, and other Plates, of which the following is a specification.

This invention is for bending stereotype, electrotype, or other plates into a curved or segmental form. I make use of a cylinder or segment of a cylinder of a radius slightly smaller than the interior surface of the plate when bent, and to this segment of a cylinder I attach a thin plate or sheet of metal, preferably steel, which is to rest upon the surface of the plate to be bent, or preferably upon an intermediate sheet of card-board that is introduced, and there is a stationary concave connected with the frame of the machine and a belt or series of small rollers between such concave and the thin sheet of steel, so that as the cylindrical segment is revolved upon its axis the small rolls travel against the interior surface of the concave and upon the exterior surface of the thin metal sheet to bend the plate to the surface of the cylinder or segment without injuring the face of the types or other matter that is stereotyped or electrotyped. The plate after being bent usually springs to an arc of a larger radius as such plate is removed from the machine. Hence the bending cylinder or segment must be of a smaller radius than that required for the sheet as bent.

Figure 1:
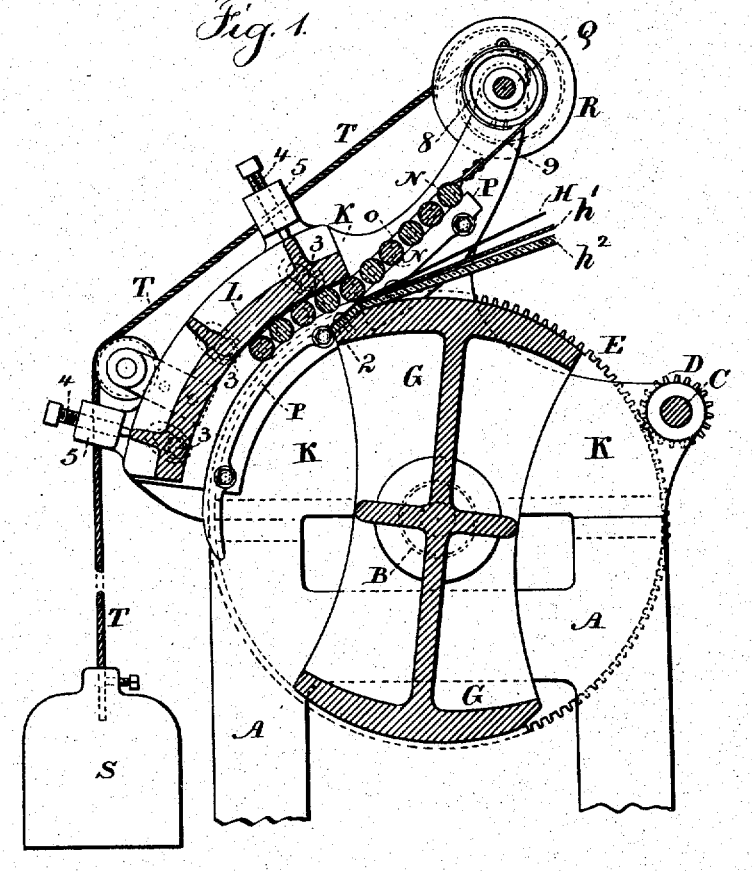
Figure 2:
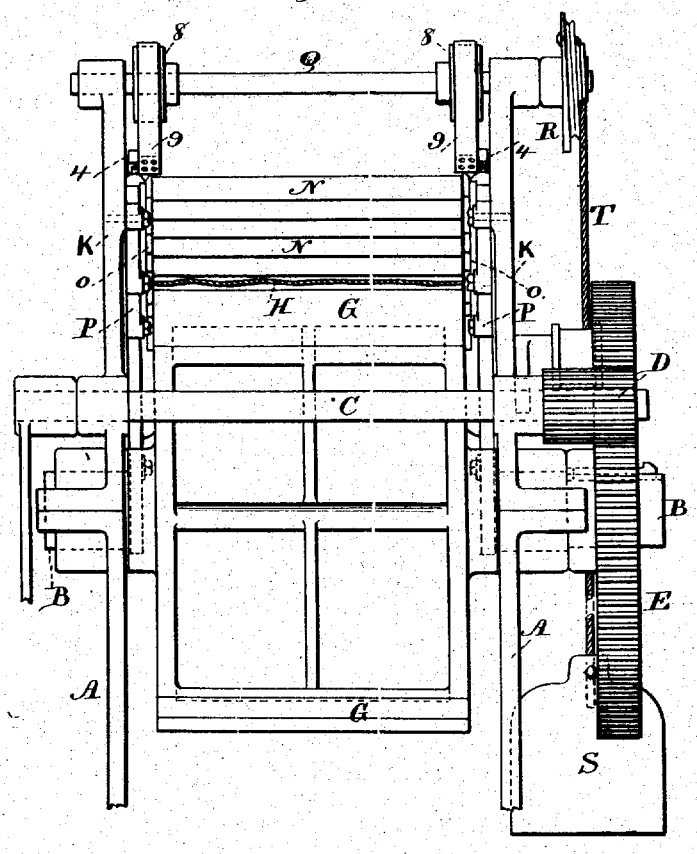
Figure 3:
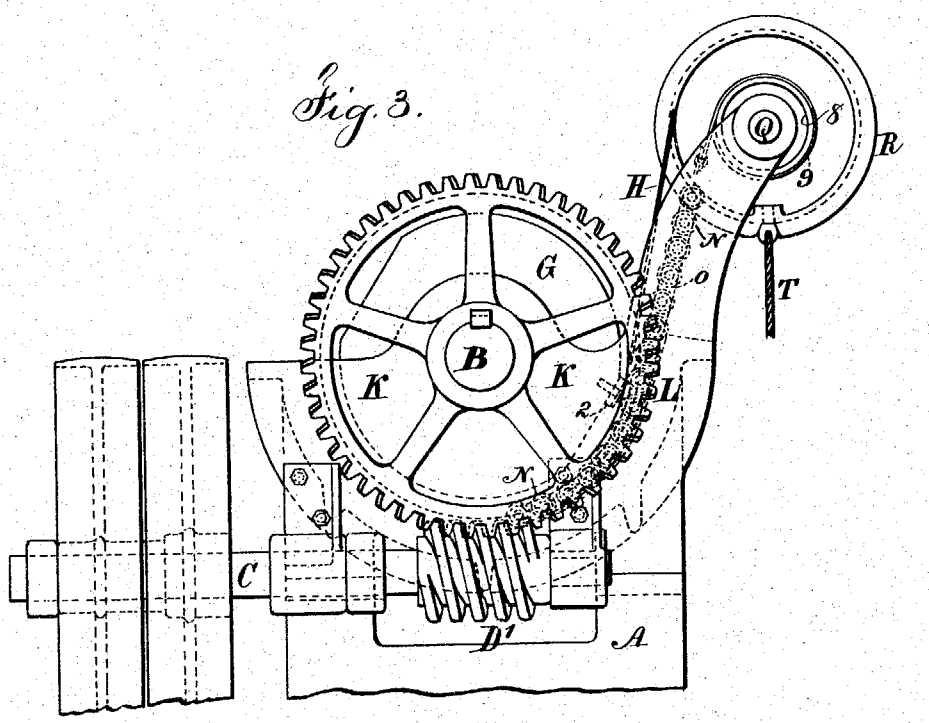

In the drawings, Figure 1 is a vertical section of the machine. Fig. 2 is an end view of the same; and Fig. 3 illustrates a modification of the apparatus specially designed for bending plates that are a half-circle, or nearly so, in their form.

The frames A K of the machine are of the desired shape, so as to be adapted to the reception of the other parts of the machine. The cross-shaft B is supported upon these frames, and it is to be revolved by suitable gearing. I have shown the cross-shaft C, pinion D, and gear-wheel E in Fig. 2 as the means for revolving the shaft B; but the wheel E′ and screw-pinion D′ may be made use of, as shown in Fig. 3, for rotating the shaft B or partially rotating the same, as required in performing the bending operation.

The cylinder or segment of a cylinder G is of the proper diameter but smaller than the interior surface of the bent plate, so that such electrotype or other plate corresponds to the diameter of the cylinder in the printing-press that is to receive the bent plate, or else it corresponds to the diameter of the shell or blocking placed upon such cylinder for the reception of the thin stereotype or electrotype. At one edge of the segment G a plate H, preferably of sheet-steel, is attached by means of an inclined cross-bar 2, and screws or other convenient devices, whereby the attaching mechanism will be within the arc of a circle coinciding with and extending beyond the surface of the bent stereotype, so that the devices for attaching the plate H will not come in contact with the bending-rolls, and the plate H should be sufficiently thin not to receive a permanent set or bend during the operation of bending the stereotype plate in order that said plate H may spring out into a flat or nearly flat condition after the bending operation has been performed, so that the bent plate is thereby exposed for removal.

The auxiliary frames K above the frames A receive between them a concave L, and this concave is connected to the frames by the bolts 3, that pass through slots, and this concave is accurately adjustable by the screws 4, passing through lugs 5 on the frames K. The slots for the bolts 3 may be in the end flanges of the concave L, or in the frames K, or both, so that the required movement may be allowed for in adjusting the concave to accommodate the parts to the diameter of the segment or cylinder G and to the thickness of the plate being bent, whether the rolls N next described are used or not. The rolls N are preferably of steel and comparatively small in diameter, and they extend across the machine and are longer than the width of the plate to be bent, and at the ends of the rolls I have shown journals connected by the links O, that form chains that unite the rollers in the form of a belt, and it is preferable to provide the roller-switch bars P upon the interior surfaces of the auxiliary frames K, and these switch-bars are of a shape to properly support the chains O and the rollers carried by the same, so that such rolls may pass in between the stationary concave L and the plate H as the cylinder or segment G and its shaft B are turned gradually, and the belt of rolls N in the normal position will be supported out of the way while the stereotype-sheet $h^2$ is being introduced, as seen in Fig. 1. I also provide a shaft Q with pulleys 8, and belts or straps 9 to the end links O, and there is a rope-wheel R at one end of the shaft Q and a weight S, connected to the rope T, passing to such wheel R, and this rope-wheel is preferably a snail or volute, so that the weight will have sufficient leverage for drawing up the chain of rolls N when not otherwise acted upon, and the leverage of the weight will diminish as such belt of rolls is drawn up, in order that the weight may offer but little resistance to the movement of the belt of rollers by the contact therewith of the plate H as the bending operation is commenced.

The operation of this machine is as follows: The stereotype, electrotype, or other plate $h^2$ is to be placed upon the surface of the cylinder or segment G, with one edge resting against the cross-bar 2, and by preference a sheet of thick paper or pasteboard $h'$ is introduced between the plate H and the letters or surface of the stereotype, and then the cylinder or segment G is revolved and the plate H is brought into contact with the belt of rolls N, and such rolls act to bend the stereotype-plate $h^2$ as the movement progresses, the rolls traveling against the concave surface of the shell L, and also upon the exterior surface of the plate H. After the stereotype-plate has been bent the movement of the shaft C may be reversed, so as to bring the segment or cylinder G back to the position represented in Fig. 1, or the rotation of the cylinder or segment may be continued until the plate H is clear of the belt of rolls N, so as to allow for the removal of the bent stereotype-plate and the insertion of another plate. In either instance the weight S restores or aids in the restoration of the belts O to the normal position indicated in Fig. 1.

The adjustment of the concave L by the screws 4 provides for any variation that may be necessary from the introduction of a thicker or thinner plate to be bent, or sheet of paper or card-board thereon, so that the proper pressure may be applied to the surface of the plate without the risk of injury to the printing-surface, and it is preferable to round the edge of the concave where the rolls enter, as seen in Fig. 3, so that the bending-operation may commence more gradually as the parts roll into the concave.

The machine represented in Fig. 3 is adapted to bending an electrotype or other plate that is nearly a half-circle. In this instance I have represented a larger number of rolls O in the belt, and have shown the concave L, as extending below the cylinder G, and without the adjusting-screws 4 and bolts 3, otherwise the construction and mode of operation corresponds to the machine before described, the same letters of reference being placed upon the respective parts.

I do not limit myself to the mechanism shown for revolving the bending cylinder or segment, and the bending operation will be the same if the bending cylinder remains stationary and the concave is revolved.

Where an ordinary metallic plate is being bent it will not always be necessary to employ the steel-plates H, as the rolls can act directly on the plate to be bent, and when there are not links to unite the rolls into a chain or belt, such rolls are to be placed in position successively by hand.

By describing the two curved surfaces of the bending-cylinder (shown in Fig. 1 with different lengths of radius) the bending-cylinder will be adapted to thicker plates at one side than the other, and by changing the belt of rolls for another belt with rolls of smaller or larger diameter the bending-machine may be adapted to different thicknesses of plates.

It will be apparent that in the operation of this device the plate H is subjected to the tension due to drawing it and the electrotype along into the concave, and that the longitudinal strain thus applied aids in bending the electrotype and holding its back against the curved bending-surface and the plate H has greater or less resiliency, according to the quality of the metal and its thickness. In all cases this plate should return to a flat or nearly flat condition after the electrotype has been bent, and such plate should be thick enough to act as a support of gradually-changing curvature as the electrotype is bent; but it must not be so rigid as to injure the printing-surface by the force required to curve such plate H in the bending operation.

I claim as my invention—

1. The combination, with the cylinder or segment G, shaft B, and mechanism for rotating the same, of the plate H, of thin sheet metal, attached at one edge to the cylinder or segment, the stationary concave L, and the belt of bending-rolls N, having links O, that connect such rollers together to form the belt, substantially as set forth.

2. The combination, with the cylinder or segment G, shaft B, and mechanism for partially rotating such cylinder or segment, of the concave L, the frame of the machine, the bolts 3, passing through slotted holes in the frame, and the set-screws 4 for attaching and holding the concave, the range of rolls N, links O for connecting the same together to form a belt, the shaft Q, pulleys 8, and straps 9, connected to the links O, and the counterweight S, rope T, and rope-wheel R, substantially as set forth.

3. The combination, with the bending cylinder or segment G, shaft B, and frame for supporting the same, of the stationary concave L, the plate H, and cross-bar 2, connected to the bending cylinder or segment, a range of rolls N, connected together by the links O to form a belt between the concave L and the plate H, and the switch-bars P, connected to the frame of the machine and serving to hold the belt of rolls away from the bending-cylinder when the parts are in position for receiving the straight plate to be bent, substantially as set forth.

4. The combination, with a bending-cylinder, of a concave partially around the same and a series of rolls rolling upon the inner surface of the concave and acting upon a plate of metal or other material to bend the same against the cylinder, substantially as specified.

5. The combination, with a bending-cylinder and a covering-sheet of metal, of a concave at one side of the bending-cylinder and a train of rolls rolling upon the inner surface of the concave and against the covering-sheet, whereby a plate is bent by the rolls and against the cylinder and protected by the sheet, substantially as specified.

6. The combination, with a bending-cylinder, of a sheet-metal plate and card-board or similar material between the plate to be bent and the bending-plate, a train of rolls, and a concave against which the rolls move, whereby a plate introduced between the card-board and cylinder is bent against such cylinder, substantially as specified.

7. The combination, with the bending-cylinder and a belt or range of rollers, of the concave having a rounded edge where the rollers enter, so that the bending operation is gradual, substantially as set forth.

8. The combination, with the bending-segment having a cylindrical surface and the concave, of a sheet of metal attached at one edge to the cylinder and a sheet of card-board or similar material between the stereotype or electrotype to be bent and the sheet of metal, substantially as specified.

9. The combination, with the concave and the bending-segment and mechanism for partially revolving the cylinder, of screws to vary the position of the concave to the bending-cylinder, as set forth.

10. The combination, with a bending-cylinder, of a concave partially around the same and a series of rolls rolling upon the inner surface of the concave and acting upon a plate of metal or other material to bend the same against the cylinder and screws for adjusting the position of the concave, substantially as specified.

11. In a machine for bending electrotype or similar plates, the combination of a normally-flat resilient plate adapted to resist a bending action, means for applying a bending pressure to the back of the electrotype, and means, substantially as described, for bending the plate against the face of the electrotype.

12. In a machine for bending electrotype or similar plates, the combination of a normally-flat resilient plate adapted to resist a bending action, means for applying a bending pressure to the back of the electrotype, and means, substantially as described, for bending the plate against the face of the electrotype and an intermediate sheet of paper or similar non-metallic material.

13. In a machine for bending printing-plates, the combination of means for subjecting the back of the type-plate to the pressure of a continuous curved surface with means for simultaneously guiding and supporting the face of the said plate against a resistance of gradually-changing curvature, whereby the plate is bent into the required form for the printing-cylinder, substantially as described.

Signed by me this 28th day of November, 1890.

WALTER SCOTT.

Witnesses:
GEO. T. PINCKNEY,
WILLIAM G. MOTT.